March 11, 1924.

M. M. EGAN

DUMP 1,486,734

Original Filed May 10, 1922  3 Sheets-Sheet 1

M. M. Egan
INVENTOR
BY
ATTORNEY
WITNESS:

March 11, 1924.
M. M. EGAN
DUMP
Original Filed May 10, 1922   3 Sheets-Sheet 2
1,486,734
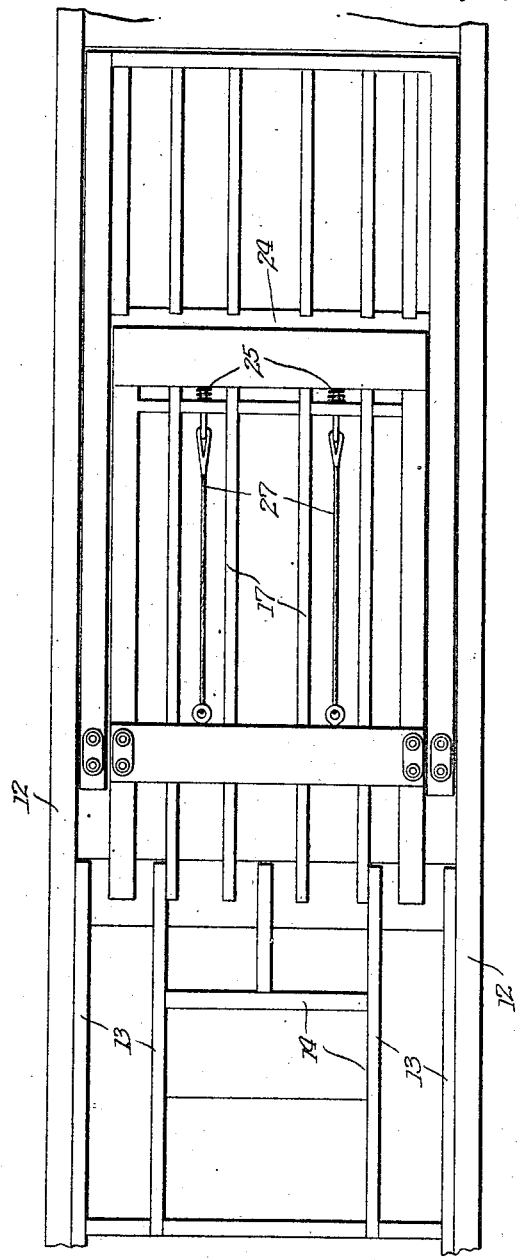
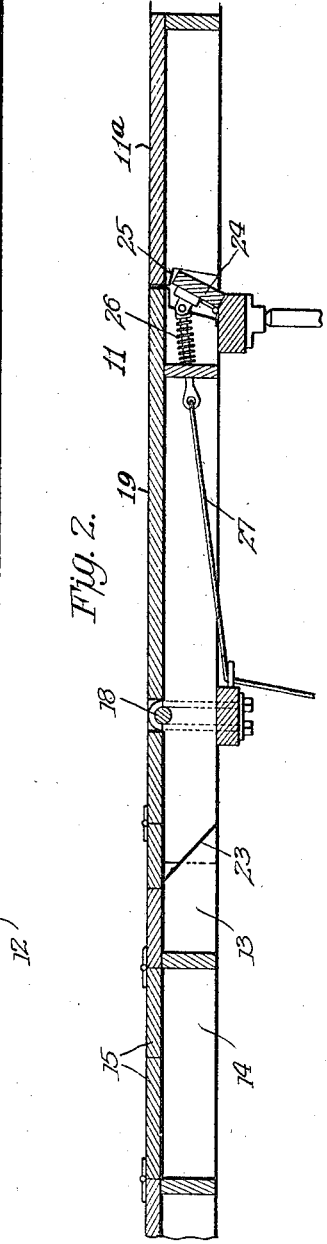
M. M. Egan
INVENTOR
BY Victor J. Evans
ATTORNEY March 11, 1924.
M. M. EGAN
DUMP
1,486,734
Original Filed May 10, 1922    3 Sheets-Sheet 3
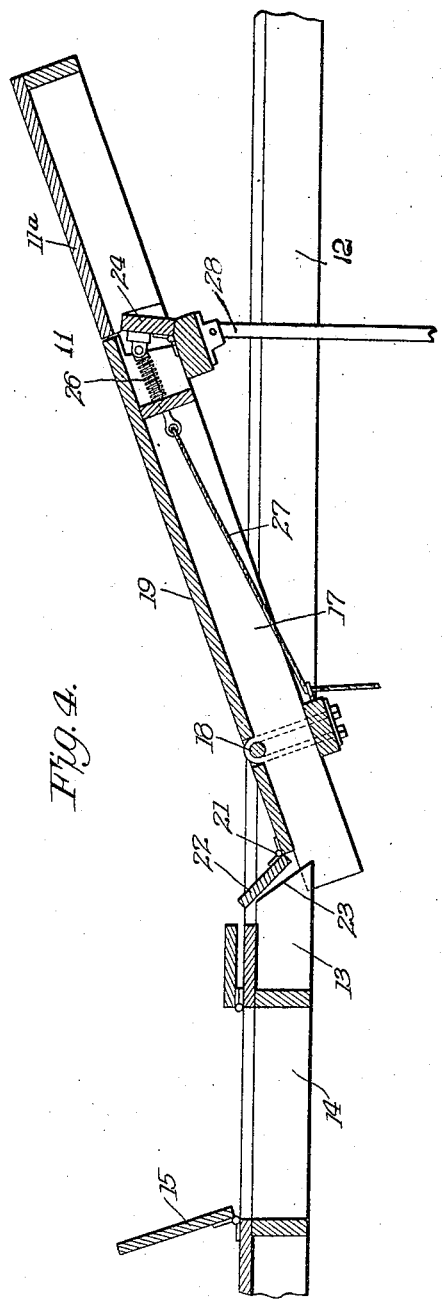
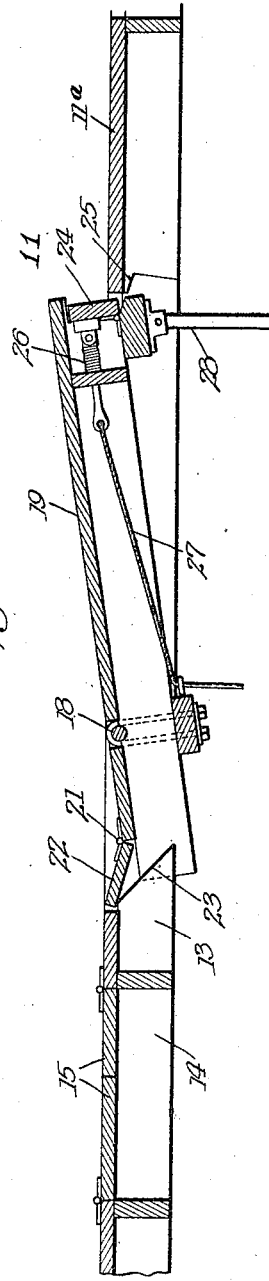
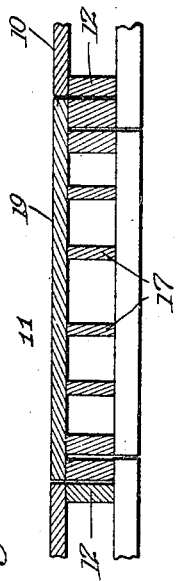
M. M. Egan
INVENTOR
BY Victor J. Evans
ATTORNEY
WITNESS:

Patented Mar. 11, 1924.

1,486,734

UNITED STATES PATENT OFFICE.

MATHEW M. EGAN, OF FORT WORTH, TEXAS.

DUMP.

Application filed May 10, 1922, Serial No. 559,858. Renewed January 29, 1924.

*To all whom it may concern:*

Be it known that I, MATHEW M. EGAN, a citizen of the United States, residing at Fort Worth, in the county of Tarrant and State of Texas, have invented new and useful Improvements in Dumps, of which the following is a specification.

This invention relates to improvements in means for dumping wagons, motor trucks, hand trucks and the like and aims to provide means whereby any of the above or similar vehicles may be moved to an inclined position to dump their loads.

With the above and other objects in view, the invention includes a pivoted platform of sectional formation, which may be locked together and which is mounted upon a stationary platform upon which it may be tilted as a whole, or one of the sections released and tilted independently, the invention being especially adapted for dumping the contents of the vehicle through an opening in the stationary portion of the platform.

Other objects and advantages of the invention will appear as the following description is read in connection with the accompanying drawings.

In the drawings:—

Figure 2 is a longitudinal sectional view of the same showing the platform in its normal position.

Figure 3 is a bottom plan view.

Figure 4 is a view showing the movable section of the platform arranged in dumping position.

Figure 5 is a similar view with the auxiliary section in dumping position.

Figure 6 is a transverse sectional view.

Figure 1:
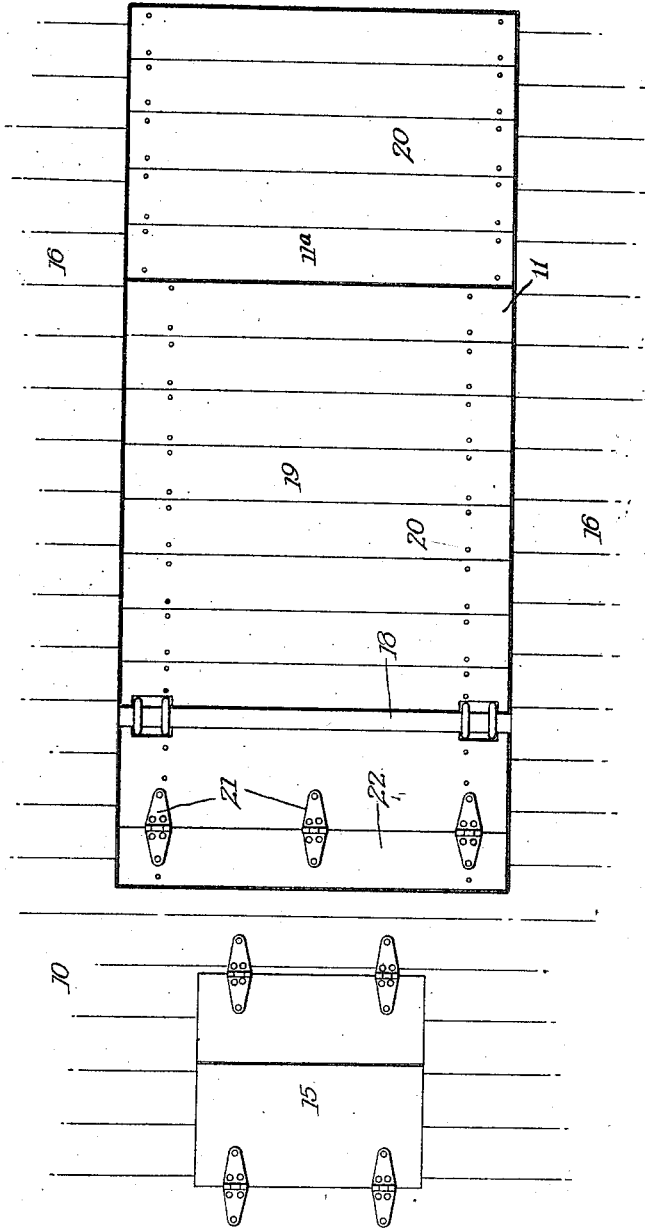
Figure 1 is a top plan view of a platform or dump constructed in accordance with the invention.

Referring in detail to the drawings, wherein like characters of reference denote corresponding parts, the improved dump is shown as comprising a platform which includes a stationary portion 10 and a movable portion 11.

The stationary portion includes longitudinally arranged long and short beams 12 and 13 respectively, the latter terminating to provide an opening within which the movable section 11 is adapted to lie. An additional frame opening 14 is provided in the stationary portion, the last mentioned opening being closed by hinged doors 15, while the remainder of the stationary portion of the platform is covered by a planking or floor 16.

The movable portion 11 of the platform includes longitudinally arranged spaced beams 17 which are of sectional formation and have their ends overlapping the adjacent ends of the short beams 13 of the stationary portion of the platform. The movable portion is pivotally mounted upon the stationary portion by means of a pivot bar 18 which is slightly spaced from one end of the movable portion. The latter may thus be tilted upon the bar 18 so that one end will be elevated and the other end lowered.

The movable portion 11 is of sectional formation and includes a main section 19 and an auxiliary section 11ª, the entire portion 11 including the sections 11ª and 19 being covered by a floor or planking 20. Hingedly secured along one end of the main section 19 as shown at 21 is a transversely extending member 22, which is in the form of a board or plank and which when the main section 19 is in its normal position will overlie the adjacent overlapping ends of the beams 13 and 17. When either the main section 19 or both of the sections 11ª and 19 are moved upon the pivot bar 18 so as to incline the said sections, the member 22 will be automatically inclined in an opposite direction through its engagement with beveled ends 23 provided upon the adjacent extremities of the beams 13. A stop is thus provided for the wheels of a wagon, truck or other vehicle so that movement in a direction toward the opening 14 will be prevented when the vehicle is elevated to a dumping position.

In order to lock the main section 19 to the section 11ª there is provided a latch bar 24, which is pivotally secured at the opposite end of the section 19 and is adapted to engage beneath the shoulder 25 provided upon the adjacent portion of the section 11ª, the said bars being urged into engagement with the said shoulder by means of a spring 26. A cable or other flexible member 27 is connected to the bar 24 to permit the same to be conveniently moved from engagement with the shoulder 25.

Various means may be provided for tilting the movable portion of the platform, such as a standard 28 which may have one end connected to the main section 19 and its opposite end connected to a suitable operating means (not shown). Thus, when the sections 11ª and 19 are locked together, the standard 28 may be operated to simultaneously tilt both sections, or the section 19 may be independently tilted by releasing the latch bar 24.

The invention is susceptible of various changes in its form, proportions and minor details of construction and the right is herein reserved to make such changes as properly fall within the scope of the appended claims.

Having described the invention what is claimed is:—

1. A dump comprising a platform including a stationary portion and a movable portion, means located adjacent one end of the movable portion for pivotally mounting the same to permit of said portion being tilted, a hinged member secured to one end of the movable portion and means formed on the stationary portion and engaging the hinged member, whereby, when the movable portion is inclined the hinged member will be inclined in a reverse direction to define a stop.

2. A dump comprising a platform including a stationary portion and a movable portion, longitudinally disposed stringers included in both the stationary and movable portions, the stringers of one portion overlapping the stringers of the adjacent portion, means located adjacent one end of the movable portion for pivotally mounting the same to permit of said portion being tilted, a hinged member secured to one end of the movable portion and overlying the overlapping ends of the stringers of each portion to normally hold said hinged member in horizontal position and beveled extremities formed on the ends of the stringers of the stationary portion for engagement with the hinged member when the movable portion is tilted whereby the said member will be tilted in a reverse direction to define a stop.

3. A dump comprising a platform including a stationary portion and a movable portion, means located adjacent one end of the movable portion for pivotally mounting the same to permit of said portion being tilted, a main section and an auxiliary section included in the movable portion, a hinged member secured to one end of the main section, a transversely disposed spring actuated locking strip having one edge hingedly secured to one end of the main section, a shoulder provided on the auxiliary section for engagement by the opposite edge of the locking strip to lock the members against independent movement, means whereby the locking strip may be operated to release the auxiliary section and means included in the stationary portion and engaging the hinged member, whereby, when the movable portion is inclined, the hinged member will be inclined in a reverse direction to define a stop.

In testimony whereof I affix my signature.

MATHEW M. EGAN.